(12) United States Patent
Mitchell et al.

(10) Patent No.: US 11,247,514 B2
(45) Date of Patent: Feb. 15, 2022

(54) TIRE MARKING APPARATUS

(71) Applicant: AKRON SPECIAL MACHINERY, INC., Akron, OH (US)

(72) Inventors: Brian Mitchell, Akron, OH (US); Ralph E. Dey, Broadview Heights, OH (US); Benjamin E. Hillman, Canton, OH (US); Charles A. Lint, Massillon, OH (US)

(73) Assignee: Akron Special Machinery INC, Akron, OH (US)

( * ) Notice: Subject to any disclaimer, the term of this patent is extended or adjusted under 35 U.S.C. 154(b) by 314 days.

(21) Appl. No.: 16/330,814

(22) PCT Filed: Sep. 22, 2017

(86) PCT No.: PCT/US2017/052922
§ 371 (c)(1),
(2) Date: Mar. 6, 2019

(87) PCT Pub. No.: WO2018/057865
PCT Pub. Date: Mar. 29, 2018

(65) Prior Publication Data
US 2019/0232637 A1  Aug. 1, 2019

Related U.S. Application Data

(60) Provisional application No. 62/398,167, filed on Sep. 22, 2016.

(51) Int. Cl.
*B41F 17/00* (2006.01)
*B60C 13/00* (2006.01)
*B41J 3/407* (2006.01)

(52) U.S. Cl.
CPC ............ *B60C 13/001* (2013.01); *B41F 17/00* (2013.01); *B41F 17/001* (2013.01); *B41J 3/4073* (2013.01)

(58) Field of Classification Search
None
See application file for complete search history.

(56) References Cited

U.S. PATENT DOCUMENTS 3,967,721 A    7/1976  Rhoden ..................... 198/195
4,778,060 A *  10/1988 Wessner, Jr. .......... B07C 5/3412
                                                    118/320

(Continued)

FOREIGN PATENT DOCUMENTS

EP    0 604 819 A2    12/1993    ............... G06K 1/12

OTHER PUBLICATIONS

International Search Report dated Dec. 5, 2017 in related application No. PCT/US2017/052922.

(Continued)

*Primary Examiner* — Jill E Culler
(74) *Attorney, Agent, or Firm* — Renner, Kenner, Greive, Bobak, Taylor & Weber

(57) ABSTRACT

An apparatus to mark a surface of an object includes a conveyor assembly having spaced apart conveyor belts with a conveyor opening therebetween. The conveyor assembly has an entry side and an exit side that supports the object. A marking assembly moves between a retracted position away from the conveyor belts, which allows movement of the object from the entry side to the exit side, and an operate position proximal the surface to be marked. At least one marker is carried by the marking assembly which marks a surface of the object when the marking assembly is in the operate position.

20 Claims, 12 Drawing Sheets

(56) References Cited

U.S. PATENT DOCUMENTS

| | | | |
|---|---|---|---|
| 5,119,109 A | 6/1992 | Robertson | 346/1.1 |
| 6,439,042 B1 | 8/2002 | Delmoro et al. | 73/146 |
| 7,295,948 B2 * | 11/2007 | Jetter | B29D 30/0061 |
| | | | 156/110.1 |
| 2001/0003871 A1 | 6/2001 | Patton et al. | 33/18.1 |
| 2012/0298286 A1 | 11/2012 | Matuszny et al. | 156/64 |
| 2013/0335502 A1 | 12/2013 | Wakazono | 347/222 |
| 2014/0069287 A1 * | 3/2014 | De Volder | B05C 1/02 |
| | | | 101/333 |
| 2015/0225104 A1 | 8/2015 | Reed | B65C 9/02 |

OTHER PUBLICATIONS

Written Opinion dated Dec. 5, 2017 in related application No. PCT/US2017/052922.

* cited by examiner

TIRE MARKING APPARATUS

CROSS-REFERENCE TO RELATED APPLICATION

This is a § 371 application of International patent application number PCT/US2017/052922 filed Sep. 22, 2017, which claims the benefit of U.S. provisional patent application Ser. No. 62/398,167 filed on Sep. 22, 2016.

TECHNICAL FIELD

Generally, the present invention is related to an apparatus for marking a surface of an object. Specifically, the present invention is directed to marking a tire bead based on input received prior to marking the tire. In particular, the present invention is directed to marking a tire bead with different colors and/or indicia based upon the test results.

BACKGROUND ART

It is well known in the tire industry to mark tires with paint or other indicia to identify the part number and/or grade quality of the tire. For example, after a tire has been tested, a tire is selectively marked based upon the test results. In some instances, proper marking consists of any combination of colored marks. Some customers may require markings on the tire bead, while others may mark the sidewall surface or tread. In any event, most marking systems currently require the use of paint rollers which are engaged by the tire during passage along a conveyor system. Another difficulty with marking tires is due to their shape and the difficulty in marking a tire surface that is not readily accessible, such as the tire bead or surfaces near the tire bead.

Prior art marking devices use paint trays and a roller which stays in the tray until needed. As the tire passes in proximity to the roller, the roller is moved to come in contact with the tire surface to be marked. Such a device is very messy as paint may spill and come in contact with other equipment. It is also cumbersome to refill the paint tray and most embodiments require machine down time in order to fill the paint trays and/or adjust the roller mechanisms. The paint or ink used for marking must also be kept moist to allow for application, but must also be quick-drying once applied. Therefore, there is a need in the art to better automate the marking apparatus and to minimize machine down time, which in turn reduces waste and the like.

SUMMARY OF THE INVENTION

In light of the foregoing, it is a first aspect of the present invention to provide a tire marking apparatus.

It is another aspect of the present invention to provide an apparatus to mark a surface of an object, comprising a conveyor assembly having spaced apart conveyor belts with a conveyor opening therebetween, the conveyor assembly having an entry side and an exit side that supports the object, a marking assembly movable between a retracted position away from the conveyor belts, which allows movement of the object from the entry side to the exit side, and an operate position proximal the surface to be marked, and at least one marker carried by the marking assembly, the at least one marker configured to mark the surface of the object when the marking assembly is in the operate position.

Yet another aspect of the present invention is to provide a method for marking an object, comprising receiving an object on spaced apart conveyor belts which form an opening therebetween, detecting a position of the object, moving a marking assembly from a retracted position to an operate position so that the marking assembly is oriented to the surface of the object to be marked that is not otherwise accessible from an external radial position of the object, marking a surface of the object with the marking assembly, and returning the marking assembly to the retracted position and moving the conveyor belts to move the object.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

As will become apparent as the description proceeds, a marking apparatus 10 or 200 may be utilized to mark any interior or adjacent surface of a ring-like structure. In the present description, reference will be made to a tire and the marking of a tire bead, which is the inner diameter surface of a tire sidewall, or an adjacent area. However, as will be appreciated by skilled artisans, the present invention may be also employed in the marking of an interior or adjacent surface of a ring-like structure, such as a tire or a cup for example, that is movable along a conveyor. In both embodiments disclosed (FIGS. 1-5 and FIGS. 6-12), the marking apparatus is configured to move a marking assembly from a retracted position to an operate position, wherein the operate position orients a marker assembly toward the surface of the object to be marked that is not otherwise accessible from an external radial position of the object. In other words, the marker assembly may mark an internal radial surface of the object, or an external surface, which may be of a non-uniform or irregular shape such as a tire sidewall, that extends from the internal radial surface to, but not including the external radial surface, such as a tire tread. In some embodiments, the surface to be marked may range from about +90 degrees to about −90 degrees from an origin of a toroidal shaped object that is centered on an axis of the toroidal object and at about a mid-point of the object's width as it lays upon the conveyor belts as will be described. The marking applied by the marking apparatus may be letters, numbers, any combination thereof, or other indicia such as colored dots or stripes. Of course, the apparatus could be used to mark any surface of an object.

Figure 1:
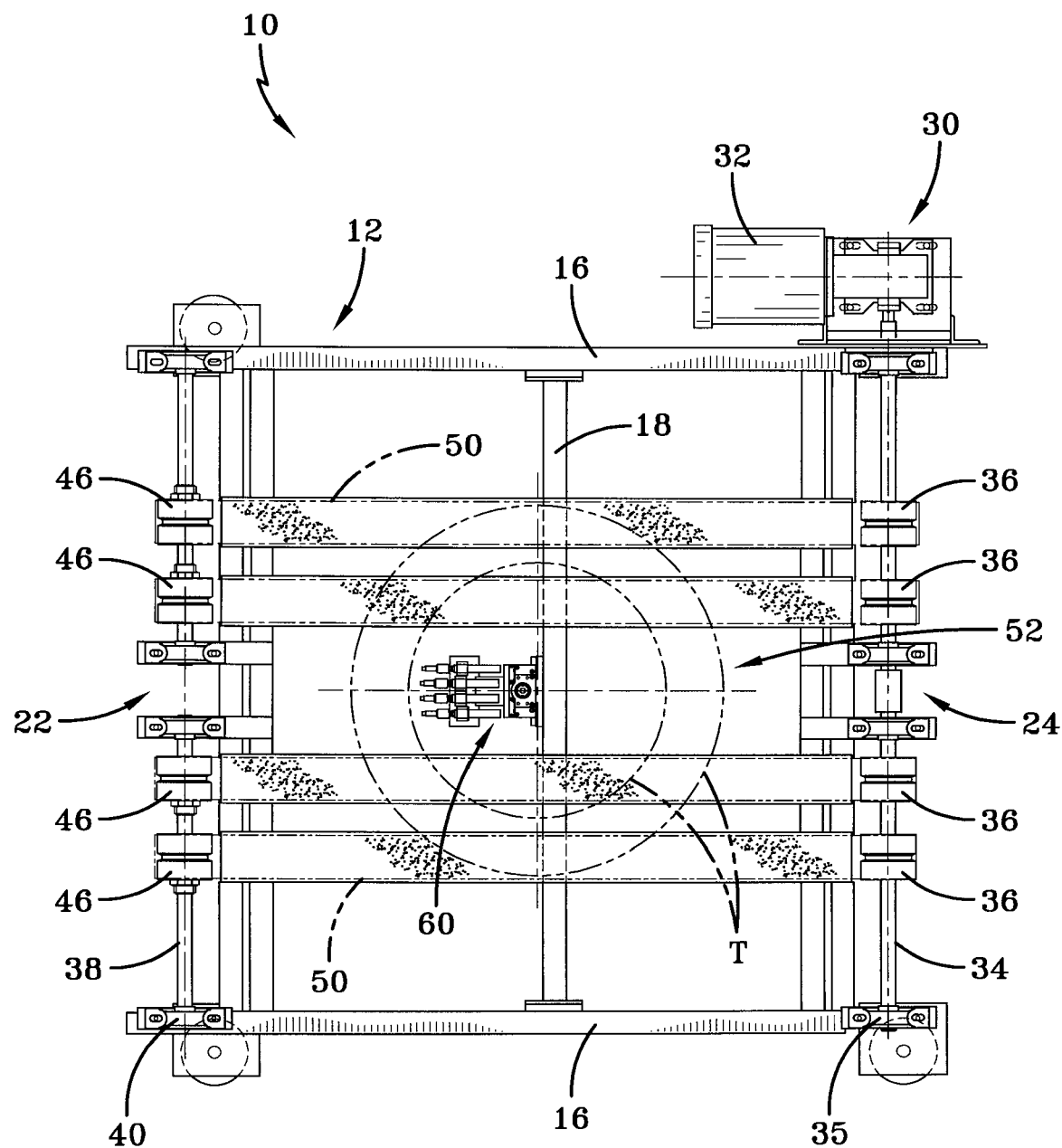
FIG. 1 is a top view of a marking apparatus according to the concepts of the present invention.
Figure 2:
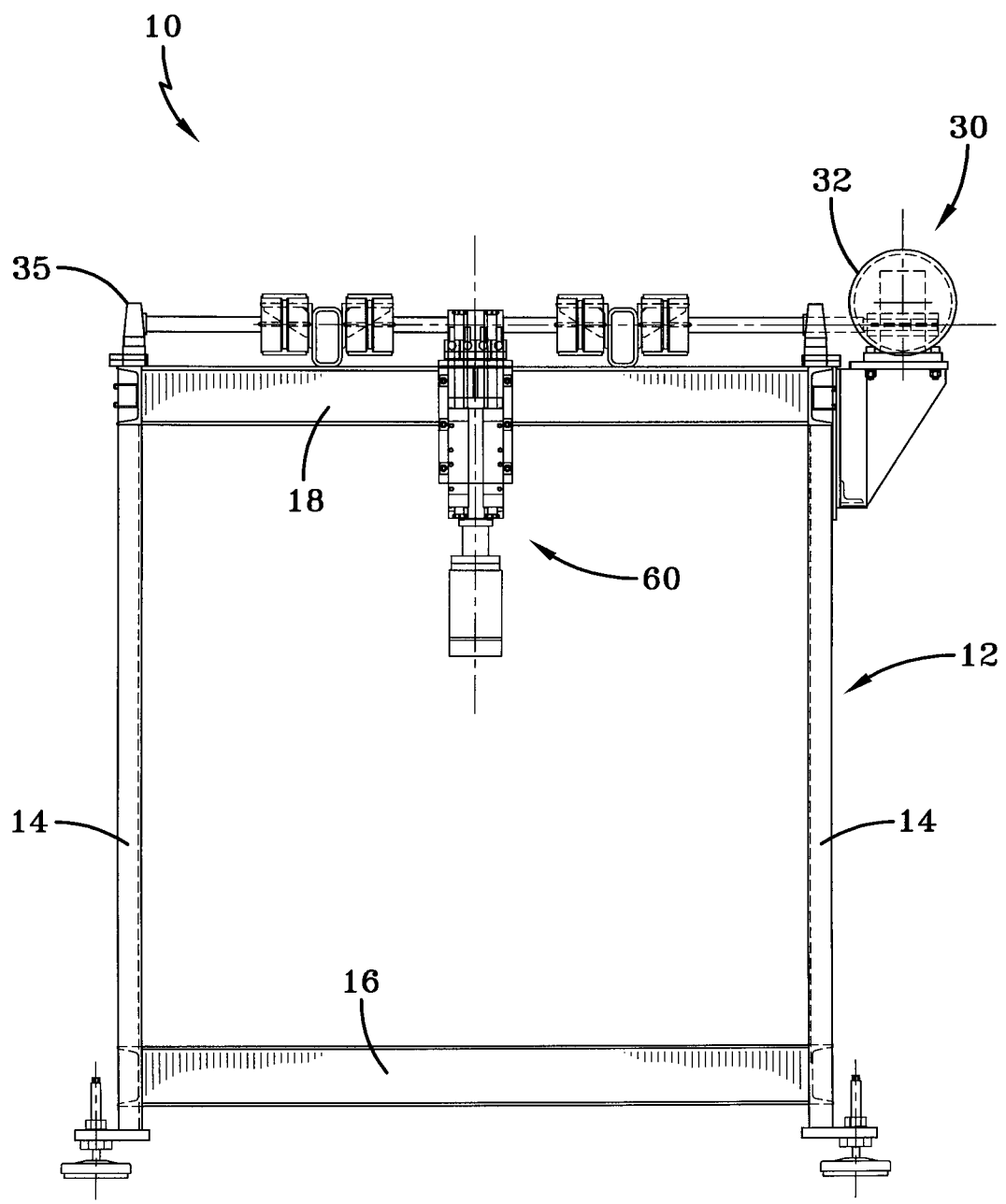
FIG. 2 is a rear elevational view of the marking apparatus according to the concepts of the present invention.
Figure 3:
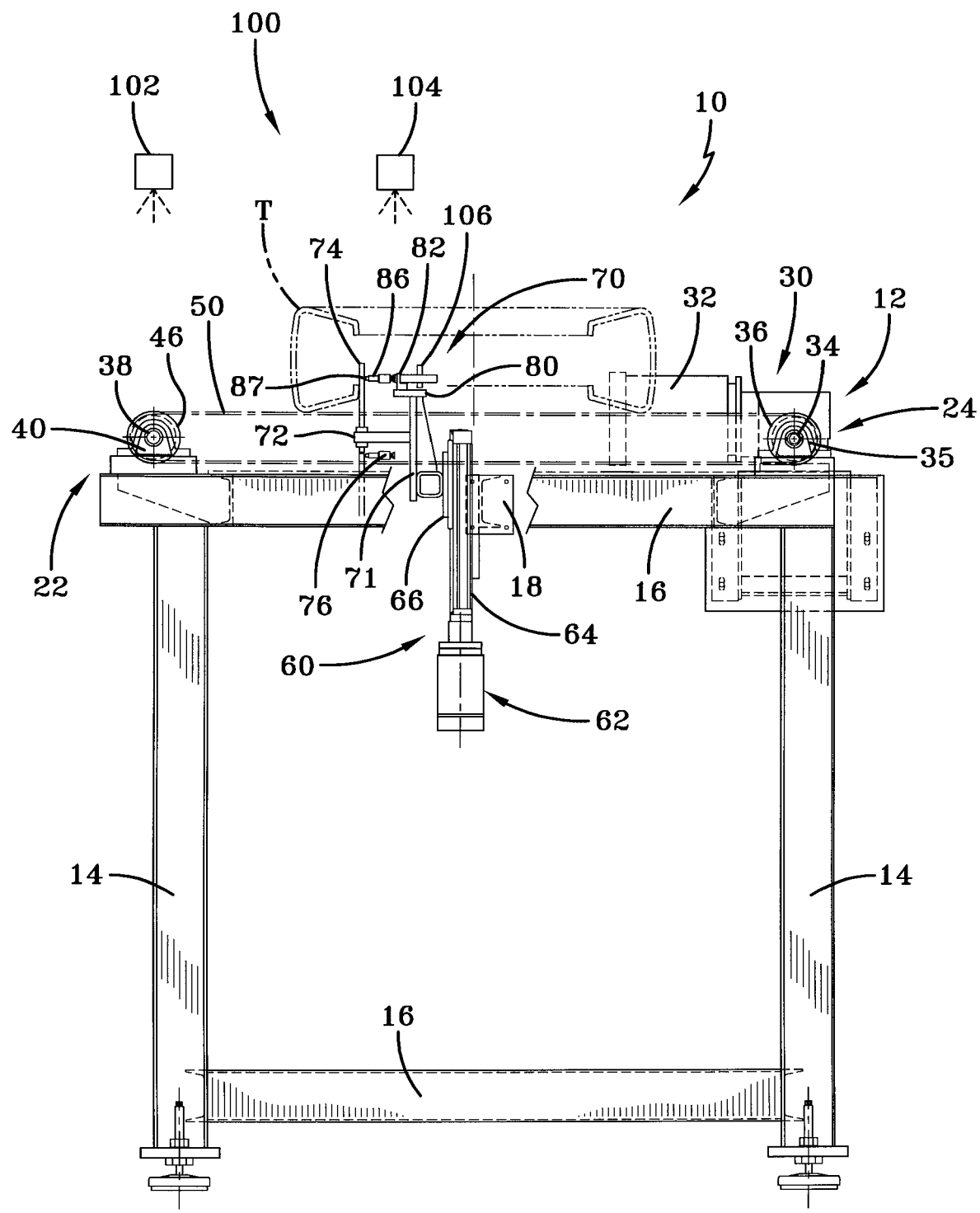
FIG. 3 is a side elevational view of the marking apparatus according to the concepts of the present invention.

Referring now to the drawings, and in particular to FIGS. 1-3, it can be seen that a marking apparatus is designated generally by the numeral 10. The marking apparatus 10 includes a conveyor table 12 which is constructed with a plurality of legs 14 that may be connected to one another by cross-frame members 16 at top and bottom ends of the legs 14. A frame member 18 may be connected at both ends of a cross-frame member 16 to provide for further structural support of the table and to carry components of the apparatus.

The conveyor table 12 provides for an entry side 22 which receives the object to be marked along one side and an exit side 24 opposite the entry side, where the marked object is transferred for further processing. The entry side is the side upon which the object first encounters the conveyor table. The object to be marked travels along the conveyor table, is marked, and then proceeds along the remaining length of the table until reaching the exit side 24.

A conveyor assembly 30 is carried by the conveyor table 12. The assembly 30 includes a conveyor motor 32 which may be carried by one of the legs and/or cross frame members 14, 16. The conveyor motor 32 rotates a drive shaft 34 which is split into halves and connected by a coupling. The drive shaft 34 is rotatably supported by a plurality of journals 35 at predetermined locations that are carried by the table. Mounted or secured to the drive shaft 34 at predetermined locations may be a plurality of drive wheels 36. In some embodiments the drive wheels 36 may have a tooth or gear-like exterior surface. In the embodiment shown, the conveyor motor 32 and associated drive shaft are positioned on the exit side 24 of the conveyor table; however, skilled artisans will appreciate that in some embodiments the conveyor motor and related components may be positioned on the entry side 22. Whichever side the conveyor motor 32 and associate components are not located, a plurality of independently rotating shafts 38, which have journals 40 at each end thereof as to facilitate rotatable movement thereof, may be carried or supported by the table 12. Mounted or secured to the shaft 38 at predetermined locations are a plurality of belt wheels 46. It will further be appreciated that in most embodiments the number of belt wheels 46 correspond to the number of drive wheels 36. And, it will further be appreciated that the belt wheels 46 may be provided with tooth or gear-like outer diameters. The wheels 36 and 46 are respectively aligned with one another. The drive wheels and the belt wheels 46 may be paired with one another to support corresponding conveyor belts 50. The conveyor belts 50 are configured as an endless loop and an interior surface thereof may be provided with a corresponding tooth or gear-like structure that may be engaged by the outer surfaces of drive wheels 36 and the belt wheels 46.

As best seen in FIG. 1, the conveyor belts 50 may be configured to be spaced apart from one another so as to provide for a conveyor opening 52 therebetween. Skilled artisans will appreciate that the belts are positioned so as to support opposed edges of the object that is being transferred by the conveyor table 12. In the case of a tire, designated generally by the capital letter T, diametrically opposed sidewall surfaces of one side of a tire are supported by the spaced apart belts such that the tire opening, the area in which the tire would be mounted on a rim, is aligned with the conveyor opening 52. Rotation of the drive shaft 34 by the motor 32 results in corresponding rotation of the conveyor belts and the rotating shaft 38 such that an object placed on the entry side may be transferred to the exit side. If needed, the motor may be stopped to perform a marking operation or to re-position the object. Additionally, the motor may reverse rotation of the drive shaft to adjust the position of the object on the conveyor table.

A marking assembly 60 may be carried by the table 12 and specifically by the frame member 18. However, in some embodiments the marking assembly 60 may be supported by other structural features not directly connected to the conveyor table 12. In any event, the marking assembly 60 is maintained so as to be aligned with the conveyor opening 52 and, in particular, with the opening provided by the object to be marked when appropriately positioned by the conveyor assembly. Moreover, the marking assembly is movable to and from a recessed or retracted position that allows the object to be transferred along the conveyor from the entry side to the exit side. The marking assembly 60 may include a linear motor assembly 62 which may be carried by the frame member 18 or other component of the table 12. The linear motor assembly 62 includes a base 64, which is the non-movable portion of the assembly that may be secured to the frame member 18. Slidably movable with respect to the base 64 is an actuator 66 which, in the present embodiment, is vertically movable with respect to the base. The actuator is movable between a recessed or retracted position so that components associated with the assembly 60 are maintained below a top surface of the belts so as to not interfere with a leading edge of the object to be marked as it moves from the entry side to the exit side. The actuator may then be moved to an operating position so that components associated within the assembly 60 may be positionable above the top surface of the belts so as to be aligned with the surface to be marked.

Figure 4:
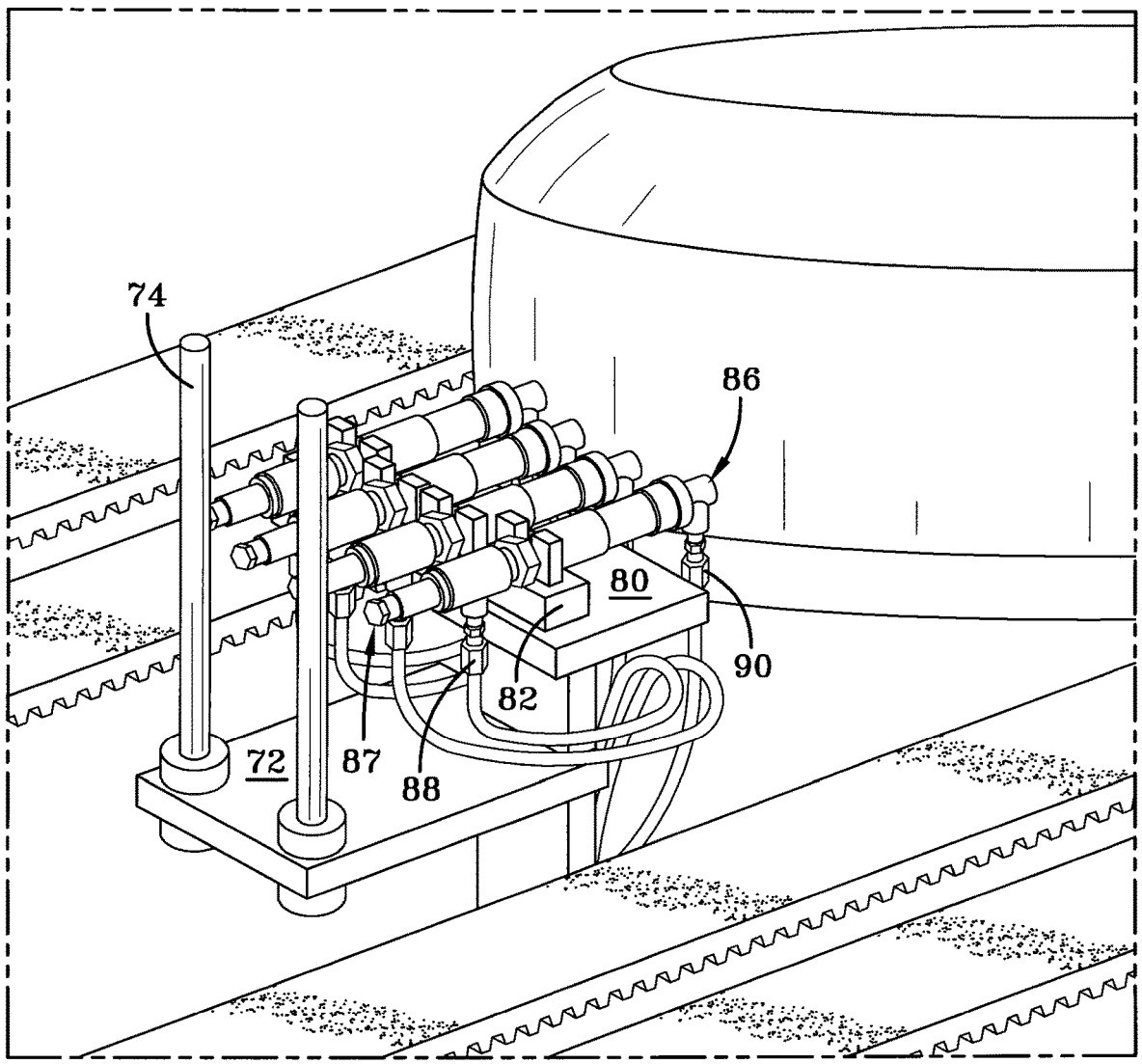
FIG. 4 is a detailed view of a marking assembly used by the marking apparatus according to the concepts of the present invention.

The marking assembly 60 may further include a marker head 70 which is carried by the actuator 66. As best seen in FIGS. 3 and 4, the marker head 70 provides a bracket 71 which may include a pin platform 72 that extends substantially perpendicularly from the bracket. At least one pin 74 extends substantially vertically upwardly from the pin platform 72. As used herein, reference to "a" pin may also refer to multiple pins. In the present embodiment two pins are employed, but more could be used. The purpose of the vertical pin or pins will be discussed in detail as the description proceeds. In any event, a bottom portion of the pin 74 may be connected to a sensor or switch 76 which detects deflection or application of a force applied to the vertical pins by the object so as to confirm a position of the object to be marked. Also extending from the bracket 71 is a marker platform 80. A marker bracket 82 may be carried by the marker platform 80 wherein the bracket carries at least one marker 86. Each marker 86 is linearly movable and fed with a colored ink, paint or the like. In the present embodiment, four markers are shown and each marker applies a different color, but skilled artisans will appreciate that any number of markers may be employed and that the marker may apply any other type of marking indicia, such as numbers, letters, any combination thereof, or symbols as deemed appropriate. Each marker 86 includes a marker tip 87 which applies the ink or paint to the object to be marked. The marker may also be of an ink jet configuration. Each marker 86 further includes a paint head 88 in which the marking fluid is injected in to the marker tip 87 for later application. The marker 86 may also include a motion actuator 90 which initiates linear movement of the marker tip into and out of engagement with the object to be marked. It will further be appreciated that the marker tips are initially spaced away from the object and are pre-positioned in a plane so as to engage the surface of the object to be marked and that they are further positioned so as to not be interfered in their motion by the vertically extending pin or pins 74. However, depending upon the inner structure of the object to be marked, the markers may be arranged in a non-planar orientation and some of the markers may be positionally offset from one another depending upon the inner radius or shape of the object to be marked.

A photo eye assembly designated generally by the numeral 100 may be carried by the conveyor table 12 or supported by some other structure near the table. In the present embodiment the photo eye assembly utilizes two photo eyes but any number of photo eyes could be employed. In the present embodiment, an entry photo eye 102 is positioned to monitor the entry side 22. The photo eye 102 is employed to detect the presence of the object onto the conveyor table. Accordingly, depending upon the known size of the object to be passed along the conveyor table, it is known how far the object needs to travel along the conveyor table to allow for alignment of the object's inner diameter or opening with the marking assembly 60 over the conveyor opening 52. A position photo eye 104 may also be provided to precisely align the object with the marking assembly 60.

Although the photo eyes 102 and 104 are generally reliable in assisting in the lateral positioning of the object to be marked in relation to the marking apparatus, it sometimes occurs that the expected position of the object to be marked is not in an ideal marking position. For example, variations in the object or tire manufacturing may result in the tire beads being farther apart or closer to each other than would be expected. In other words, the height position of the bead to be marked with respect to the conveyor belts, and in particular the markers 86, may not be obtained. As a result, the markers do not properly mark the bead, but instead undesirably mark the sidewall or fail to mark the bead at all. Accordingly, a laser range finder 106 may be carried by the marker platform 80. Prior to initiating the marking sequence by any one of the markers 86, the laser range finder 106 may determine the actual height of the bead or surface to be marked. Next, the height position of the marking assembly is adjusted as needed and subsequently the marking of the object is initiated.

Generally, when the entry photo eye 102 detects the object to be marked, which may have momentum from the preceding conveyor or workstation, the conveyor motor 30 is started and moves the object via the conveyor belts a known travel distance based upon the size of the object. This movement generally aligns the interior of the tire over the marker head 70. Once the predetermined distance has been traveled, the conveyor motor stops, as does the tire. At this time, the marker head 70 is moved vertically upwardly so that the marker assembly is within the object's interior. Then, the object may be further moved by the conveyor assembly 30 until such time that the position photo eye 104 detects and confirms that a particular surface of the object is properly aligned with the marking head. This can further be confirmed by the vertical pin or pins 74 and associated pin sensors or switches 76. Additionally, the laser range finder 106 may confirm the height of the surface to be marked in relation to the supporting conveyor belts 50 to allow for vertical position adjustment of the marker head 70 as needed. In other words, as soon as the interior surface engages the vertical pins and the associated sensors or switches, then the conveyor motor is stopped. In some instances the pins 74 may be employed to stop movement of the object and serve as a known reference point. Once this is complete, then the marking operation can begin as will be described.

Figure 5:
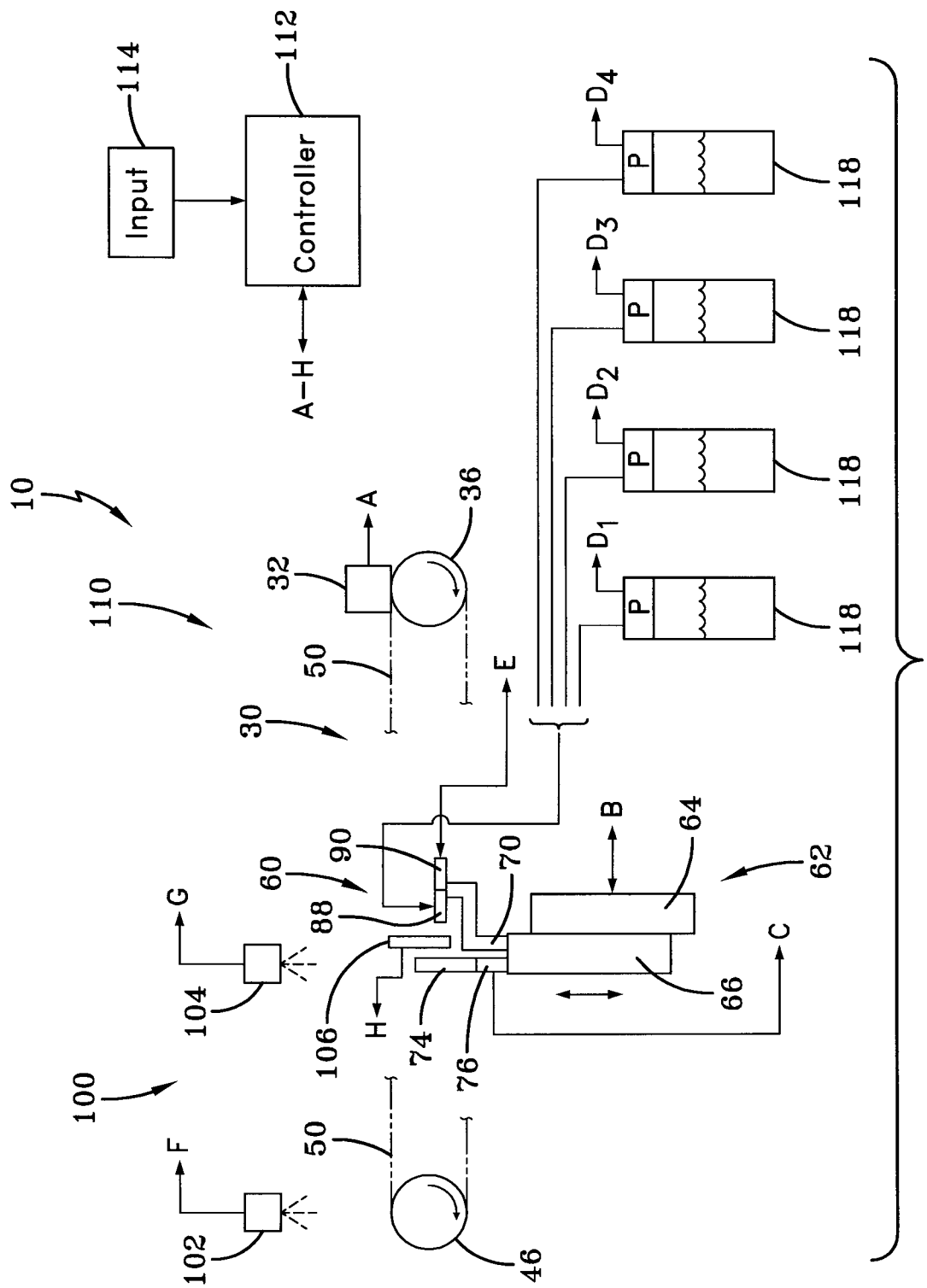
FIG. 5 is a schematic diagram of the marking apparatus and an associated control system according to the concepts of the present invention.

Referring now to FIG. 5, it can be seen that a control system 110 is associated with the marking apparatus 10. The control system 110 includes a controller 112 which contains the necessary hardware, software and memory so as to receive various inputs from the marking apparatus and related components and also generate outputs to perform the necessary functions. Additionally, the controller 112 may receive an input 114. In the present embodiment, the tire is to be marked according to previously obtained test results. These test results may be provided to the controller 112 via input 114. Based upon the operational properties, a marking designation is selected which associates a grade or quality with the tested tire. For example, if the test results of the tire meet certain thresholds, then one designation may be selected, whereas if the test results meet some but not all thresholds, then the tire may be designated with another marking.

The controller 112 may also receive inputs from various components of the marking assembly and also generate outputs to control some or all of the same components. The inputs to and outputs generated by the controller may also be referred to as signals. For example, the conveyor motor 32 will generate an input and receive an output signal connected to the controller and is designated by the capital letter A. As such, the controller may turn the motor 32 on and off, or reverse the motor, as needed so as to transfer the object to be marked into the various positions. The controller 112 also communicates with the actuator 66 via an input/output signal designated by the capital letter B. Signals generated by the pin switches or sensors 76 are designated by the capital letter C. The delivery of paint to the marker tip is associated with the paint head 88, wherein delivery of paint to the paint head is from the paint reservoirs 118. Four paint reservoirs are shown, and each reservoir is associated with a specific marker. A pump or other mechanism may be used to transfer the paint within the reservoir to the marker tip and operation of the pumps, designated by the letter P is controlled by signal D. Although not shown, other mechanisms and gauges may be employed to ensure the steady flow of the paint from the reservoirs to the corresponding tip. The motion actuator 90 is controlled by a signal designated by the capital letter E. The movement of the motion actuator 90 may be accomplished with hydraulic or magnetic actuators. The entry photo eye 102 generates a signal designated by the capital letter F while the position photo eye 104 generates a signal designated by the capital letter G. The laser range finder 106 generates a signal designated by the capital letter H that is also received by the controller.

In operation, the input received from the input 114 instructs the controller 112 as to what combination of markers are to be applied to the object. As previously discussed, the entry photo eye 102 detects the presence of an object to be marked and starts the conveyor belts so as to position an interior of the object in alignment with the marker assembly. At this time, the marker is moved vertically upward so as to align the marker(s) with the surface to be marked. Next, the controller instructs the conveyor motor 32 to further move or jog the conveyor belts so that the surface to be marked is moved to a position detected by the photo eye 104 and/or the object engages the vertical pins 74, which may be confirmed by the actuation of the pin switches 76. However, in some embodiments, the vertical pin 74 may simply provide for a mechanism to stop the object at a predetermined position and final positioning is controlled by detection of the object's position by the photo eye 104. Additionally, the laser range finder 106 may be used to confirm the precise height of the object to be marked. The controller, upon receiving the signal H, may further adjust the vertical height of the marker head 70 with appropriate signals to the actuator 66. The readjusted height may be re-confirmed by the range finder 106. In any event, once the object is in a confirmed position the motion actuators 90 will be actuated by the controller to move the selected marker or markers and apply a designated mark onto the surface of the object. Appropriate sensors maintained by the pumps will determine when the marker is running low on ink or paint and an appropriate amount of fluid is then pumped to the marker head. The actuator associated with the marker tip 87 has a predetermined or adjustable linear movement so as to apply the mark and then withdraw the tip so that the marking assembly can be moved vertically downwardly once the marking operation is complete. Once the linear actuator signals the controller that the marking assembly is withdrawn to the recessed or retracted position, the controller instructs the motor 32 to move the conveyor a predetermined amount so as to move the object on to the next manufacturing station. Once this process is completed it can be repeated for the next object.

Skilled artisans will appreciate that the mechanism and associated operation described herein allows for an automated marking system that does not rely upon the filling of paint trays or spring loaded actuation devices to mark tires. As a result, the amount of paint or ink applied is sufficient for the process and minimal waste is incurred. Moreover, the paint or ink is maintained in contained reservoirs so that the material can be easily supplemented as needed so as to incur minimum downtime in this aspect of the operation.

Referring now to FIGS. 6-9, it can be seen that an alternative marking apparatus is designated generally by the numeral 200. As with the previous embodiment, the marking apparatus 200 is utilized to mark an interior surface of a ring-type structure. And, as with the previous embodiment, the present embodiment is utilized for marking a tire and the marking of an area on or near the tire bead. However, as with the previous embodiment, the present embodiment may also be employed for marking an interior surface of any ring-like structure that is movable along a conveyor. The marking applied by the marking apparatus may be letters, numbers, symbols or any combination thereof, or other indicia such as dots or stripes. If desired, the apparatus 200 may be adapted to mark any surface of an object.

The marking apparatus 200 may include a number of similar structural features relating to the conveyor table 12, and the associated conveyor features utilized for moving the object or tire from an entry side 22 to an exit side 24. As such, the identifying numbers are the same for structural features that are the same as in the previous embodiment.

In the present embodiment a pin stop assembly designated generally by the numeral 210 is secured to the frame member 18 and mounted below the conveyor belts 50. Generally, the pin stop assembly 210 is raised from a recessed or retracted position to an area above the travel area of the object on the conveyor belts and inside the object to allow for stopping of the object for later fine position adjustment. In the present embodiment, a marking assembly designated generally by the numeral 214 is supported by the conveyor table 12 as will be described in detail below.

Figure 6:
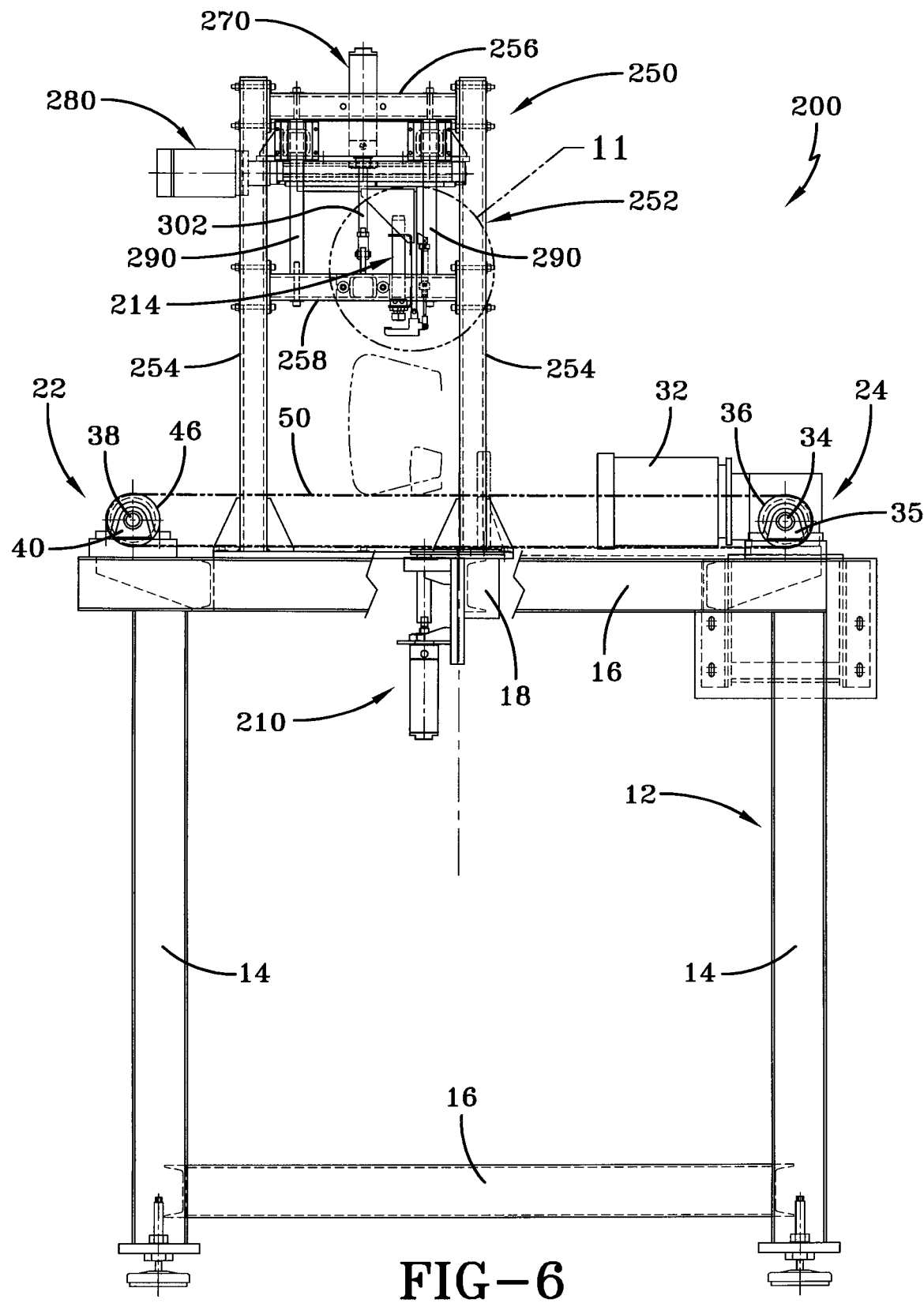
FIG. 6 is a side elevational view of an alternative marking apparatus according to the concepts of the present invention.
Figure 7:
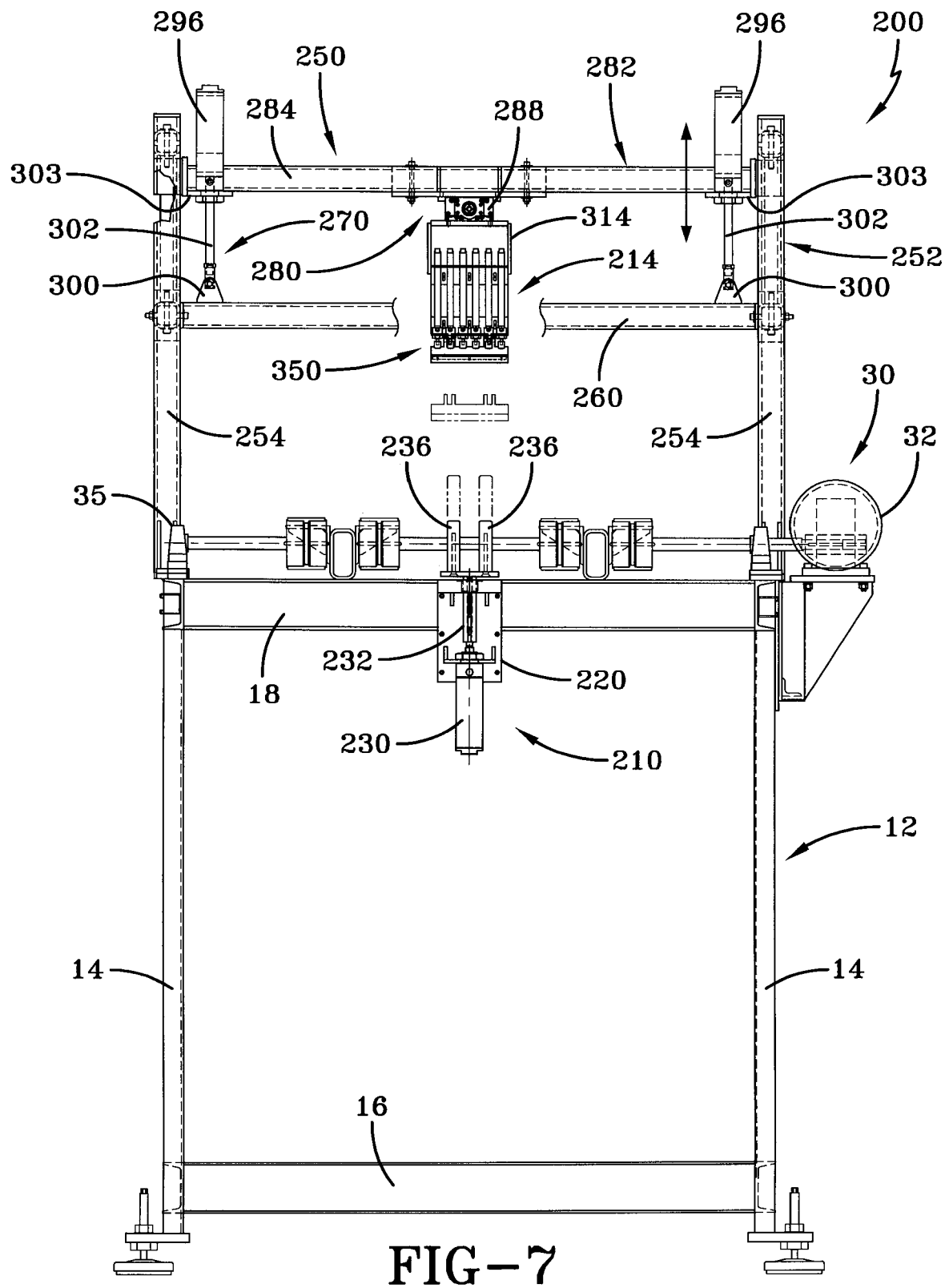
FIG. 7 is a front elevational view of the alternative marking apparatus according to the concepts of the present invention.
Figure 10:
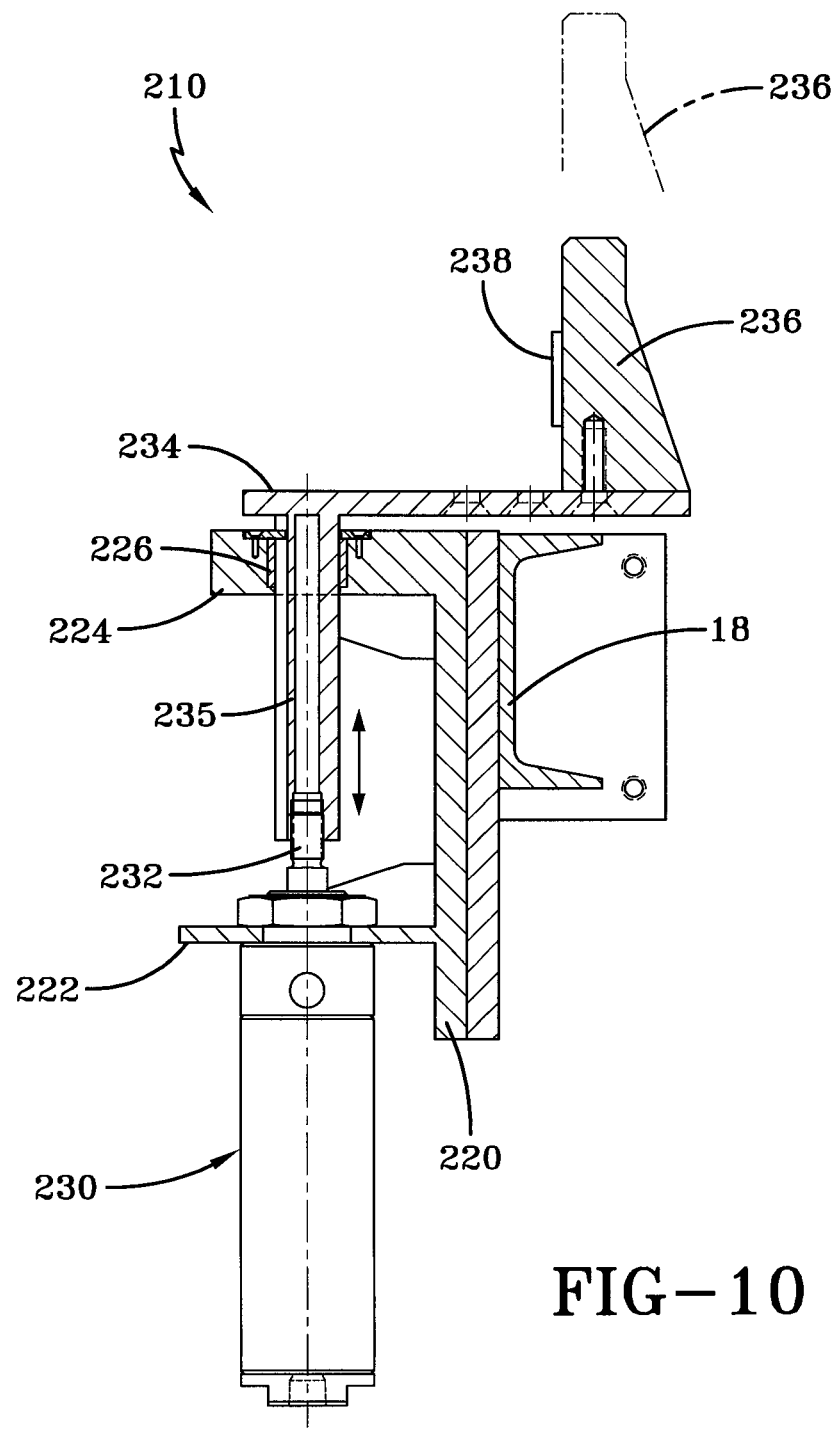
FIG. 10 is a detailed view of a pin stop assembly used in the alternative marking apparatus according to the concepts of the present invention.

As best seen in FIGS. 6, 7 and 10 the pin stop assembly 210 includes a mounting frame 220 which may be attached to the frame number 18. As in the previous embodiment, the pin stop assembly 210 is raised and lowered with respect to the frame member 18 so as to place the pin stop assembly 210 into the path of the object to be marked. In particular, the pin stop assembly is maintained in the recessed or retracted position as the object passes from the entry side, and at the appropriate time when the object or opening provided by the object passes over the pin assembly, then the pin assembly is raised into the interior of the object. The object is then moved until such time that it comes in contact with the pin assembly as determined by a switch or sensor 238 or other control feature so as to provide for precise positioning of the object before it is marked.

As best seen in FIG. 10, the mounting frame 220 includes a cylinder flange 222 which extends perpendicularly therefrom at one end and a keeper plate 224 which extends perpendicularly at an opposite end of the mounting frame and in the same general direction as the cylinder flange 222. The keeper plate 224 maintains a bushing 226 therethrough. A double-acting cylinder 230 is held at about its middle portion by the cylinder flange 222. Extending from the double-acting cylinder 230 is a piston 232 which extends axially from the cylinder and moves in a vertical up and down direction through the bushing 226. Connected to an end of the piston 232 opposite the cylinder 230 is a mounting plate 234, wherein the piston end is connected to an underside of the mounting plate 234. Extending substantially perpendicularly from an edge of the mounting plate is at least one stop pin 236. Accordingly, when the pin stop assembly is in a recessed or retracted position, a top surface of the stop pins 236 is maintained at a level below the conveyor belts as best seen in FIGS. 6 and 7. Once the object has partially passed over the pin stop assembly 210, the double-acting cylinder 230 is actuated so that the piston 232 moves upwardly thus resulting in the mounting plate and the stop pins 236 entering or extending through the conveyor open 52 into an interior area of the object to be marked. Once the stop pins 236 are raised above the surface of the conveyor belts 50, the conveyor belts are moved such that the interior surface of the object comes in contact with the stop pins 236. Skilled artisans will also appreciate that the mounting plate 234 may function to support a portion of an underside of the object to be marked that would not otherwise be supported by the conveyor belts 50.

Referring now to FIGS. 6-9, it can be seen that a carriage assembly is designated generally by the numeral 250. The carriage assembly 250 is supported by the conveyor table cross-frame members 16 and carries the marking assembly and other components and features to move the marking assembly into and out of position with respect to the object to be marked as the object to be marked travels from the entry side 22 to the exit side 24. The carriage assembly 250 includes a carriage frame 252 which is bolted or otherwise fastened to the conveyor table 12. In particular, the carriage frame may provide for a plurality of posts 254 which extend vertically upward from the cross frame members 16 in a substantially parallel relationship. In the embodiment shown, the frame posts 254 provide for two front posts and two rear posts, wherein the front posts and rear posts are substantially parallel with one another. And the posts that extend from the same cross frame member 16 i.e., the same side, are also parallel with one another. Connecting the frame posts that extend from the same cross frame member 16 to one another are a pair of upper post braces 256 that are at the end of the frame posts 254 opposite the cross frame member and a corresponding pair of lower post braces 258 which also connect the frame posts to one another at about a midpoint of the frame posts 254. As a result, the upper post braces 256 and the lower post braces 258 are parallel with one another. And the upper post braces and the lower post braces on one side are at substantially the same height as the respective upper and lower post braces on the opposite side of the carriage.

A cross brace 260 may extend and connect the opposed lower post braces 258 to one another. In some embodiments, a photo eye 262 may be connected at about a midpoint of the cross brace 260. The photo eye 262 is configured to look downwardly upon the object as it passes from the entry side to the exit side and provides positional information to assist in operation of the conveyor and also the marking apparatus as will be discussed.

A height adjustment apparatus 270 is carried by the carriage assembly 250 and in particular the carriage frame 252. The height adjustment apparatus may be configured to carry a lateral adjustment apparatus designated generally by the numeral 280. In the present embodiment the lateral adjustment apparatus moves with respect to the height adjustment apparatus, but those skilled in the art will appreciate that the height adjustment apparatus may be configured to be movable with respect to the lateral adjustment apparatus. In any event, either one of the height adjustment apparatus or the lateral adjustment apparatus 280 may directly carry the marking assembly 214. Both the height adjustment apparatus and the lateral adjustment apparatus are configured so as to carry the marking assembly 214 from a retracted or recessed position with respect to the object, to a position in close proximity to the object to be marked, and then finally to a marking position so as to mark the object. Both the height adjustment apparatus and the lateral adjustment apparatus may then move the marking assembly 214 for return to the retracted or recessed position.

Figure 8:
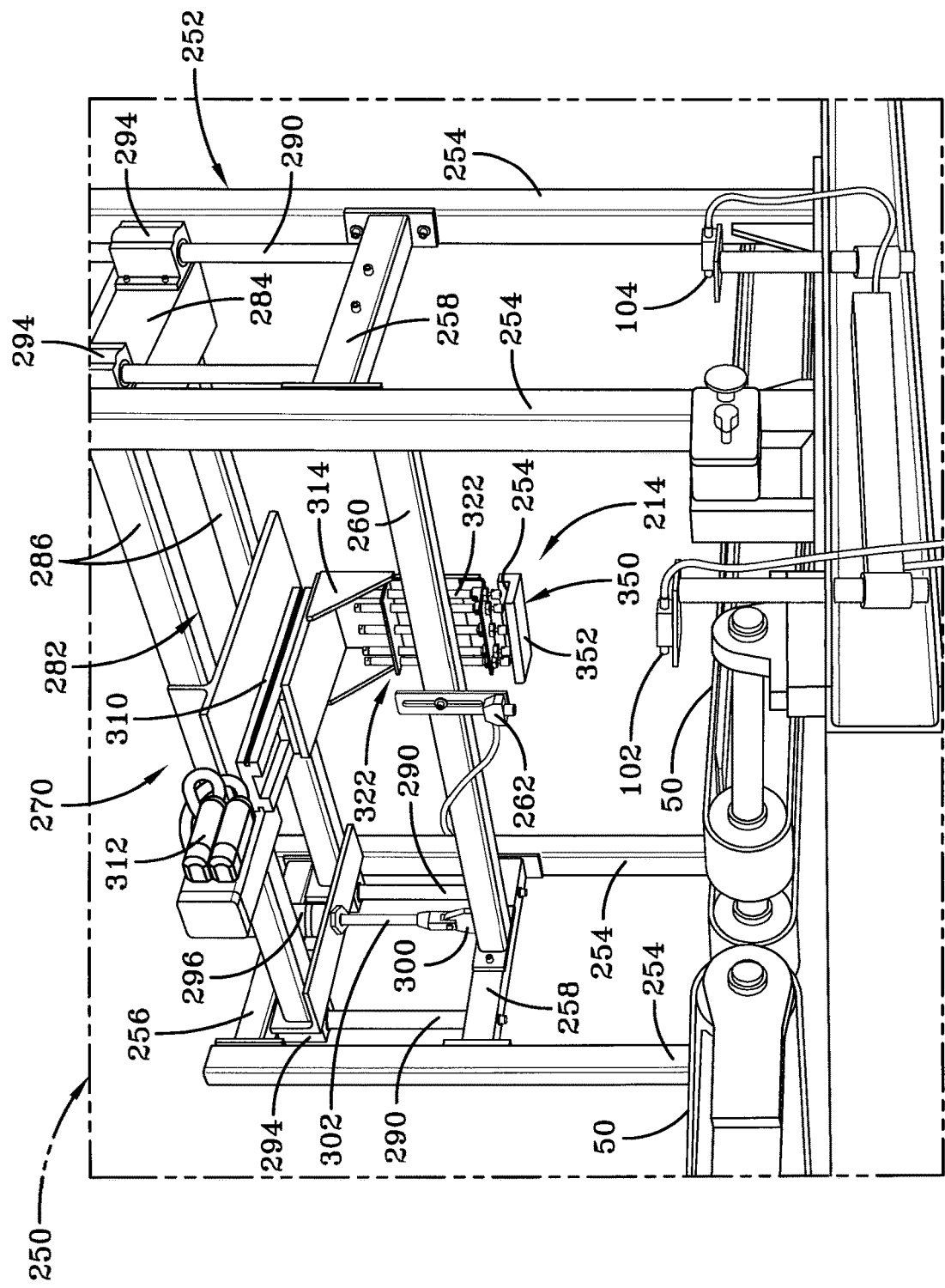
FIG. 8 is a front perspective view of the alternative marking apparatus according to the concepts of the present invention.
Figure 9:
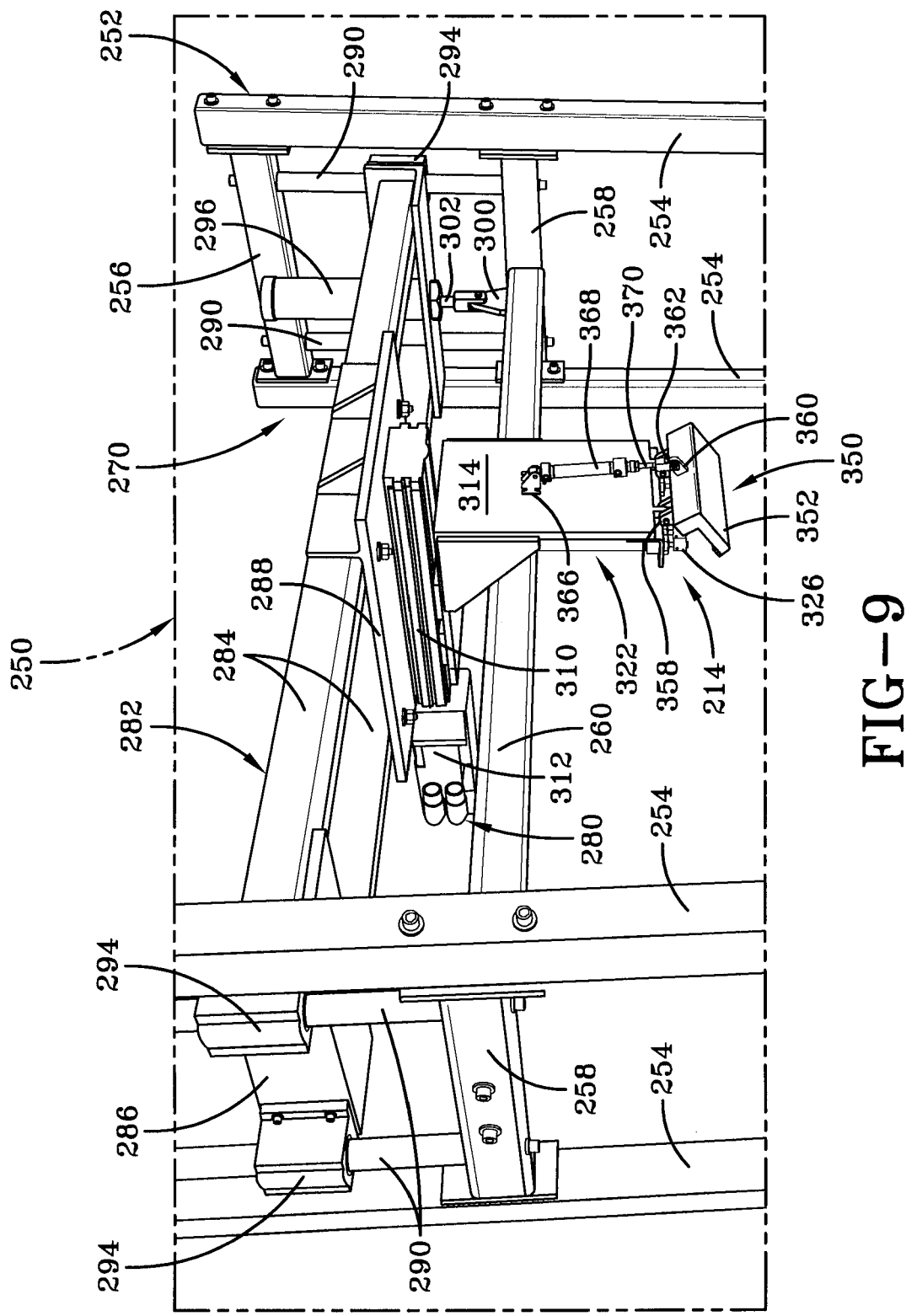
FIG. 9 is a rear perspective view of the alternative marking apparatus according to the concepts of the present invention.

As best seen in FIGS. 8 and 9, and also with reference to FIGS. 6 and 7, the height adjustment apparatus 270 may provide a slidable marker frame 282 which is vertically movable between the upper and lower post braces 256 and 258. The slidable marker frame 282 may be generally rectangularly shaped and configured to move within the framework of the carriage assembly 250. The marker frame includes a pair of opposed side beams 284 which are substantially parallel with but inset with respect to the upper and lower post braces 256,258. Connecting each end of the side beams 284 to one another may be a pair of opposed and parallel cross beams 286. This forms a generally rectangular shape that is movable between the upper post braces and the lower post braces. At about a midpoint of the cross beams 286 and suspended thereunder is a slide platform 288. The slide platform 288 may be aligned about and above the conveyor opening 52 and serves to carry the lateral adjustment apparatus 280 in a manner that will be discussed in detail as the description proceeds.

A plurality of linear bearing shafts 290 may extend between the aligned upper and lower post braces and are positioned between the frame posts 254 that connect the post braces to one another. A like number of shaft sleeves 294 may be secured to the outer facing surfaces of the cross beams 286 of the slidable marker frame 282 and are slidably mounted onto the linear bearing shafts 290. As a result, the connected slidable marker frame is movable upon the linear bearing shafts 290 in a vertical direction with respect to the conveyor table.

In order to facilitate movement of the slidable marker frame 282, a marker frame double-acting cylinder 296 may be mounted to each cross beam 286 at about a midpoint thereof. Extending from the cylinder 296 is a piston 302 that may extend from the cross beam 286 at one end and at an opposite end is connected by a laterally extending bracket 303 to the lower post brace 258 at about a midpoint thereof. Although the drawings show that a cylinder 296 is provided at both ends of the slidable marker frame 282, skilled artisans will appreciate that in some embodiments a single double-acting cylinder may be provided as a connection between the slidable marker frame 282 and the lower post brace 258. It will further be appreciated that the piston end extending from the cylinder 296 is connected to a piston bracket 300 mounted to the lower post brace 258.

Skilled artisans will appreciate that actuation of the cylinder 296 moves the height adjustment apparatus 270 in a vertical direction. Use of the height adjustment apparatus is desired to accommodate different sizes of objects. In other words, tires of different tread width pass underneath the height adjustment apparatus. If the tire is of a narrow width construction, then the height adjustment apparatus is lowered to the appropriate position. However, if the tire width is wider, then the height adjustment apparatus may be raised within the boundaries defined by the upper and lower post braces.

The lateral adjustment apparatus 280 may be mounted to an underside of the slide platform 288 that interconnects the cross beams, at about a midpoint. Extending beneath the slide platform 288 is a linear positioning table 310. As can be seen in the drawings, the linear positioning table may carry the marking apparatus 214. A servomotor 312 is connected to the linear positioning table and functions to move the table 310 with respect to the slide platform 288.

Figure 11:
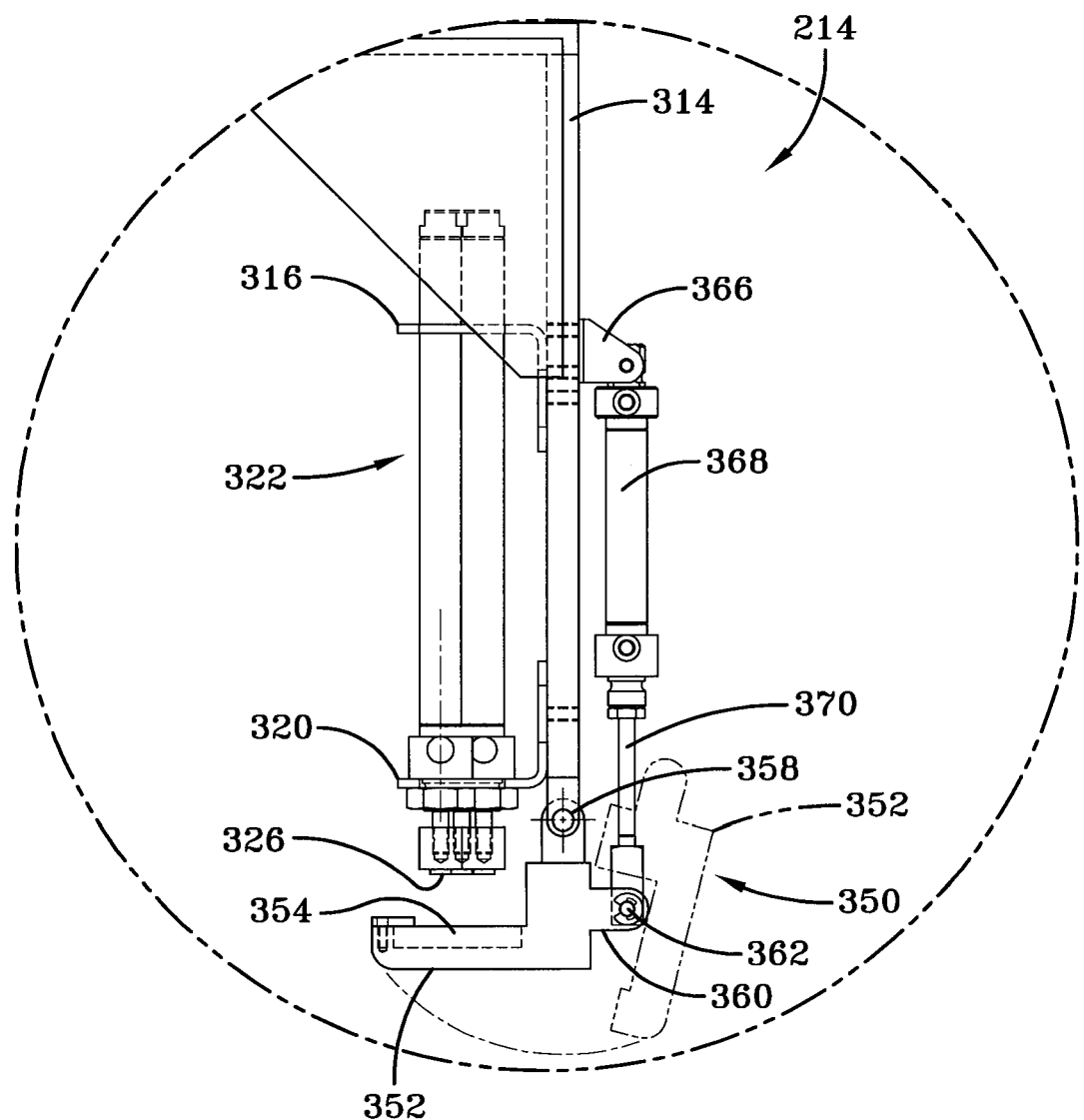
FIG. 11 is a detailed side elevational view of a marking assembly used in the alternative marking apparatus according to the concepts of the present invention.
Figure 12:
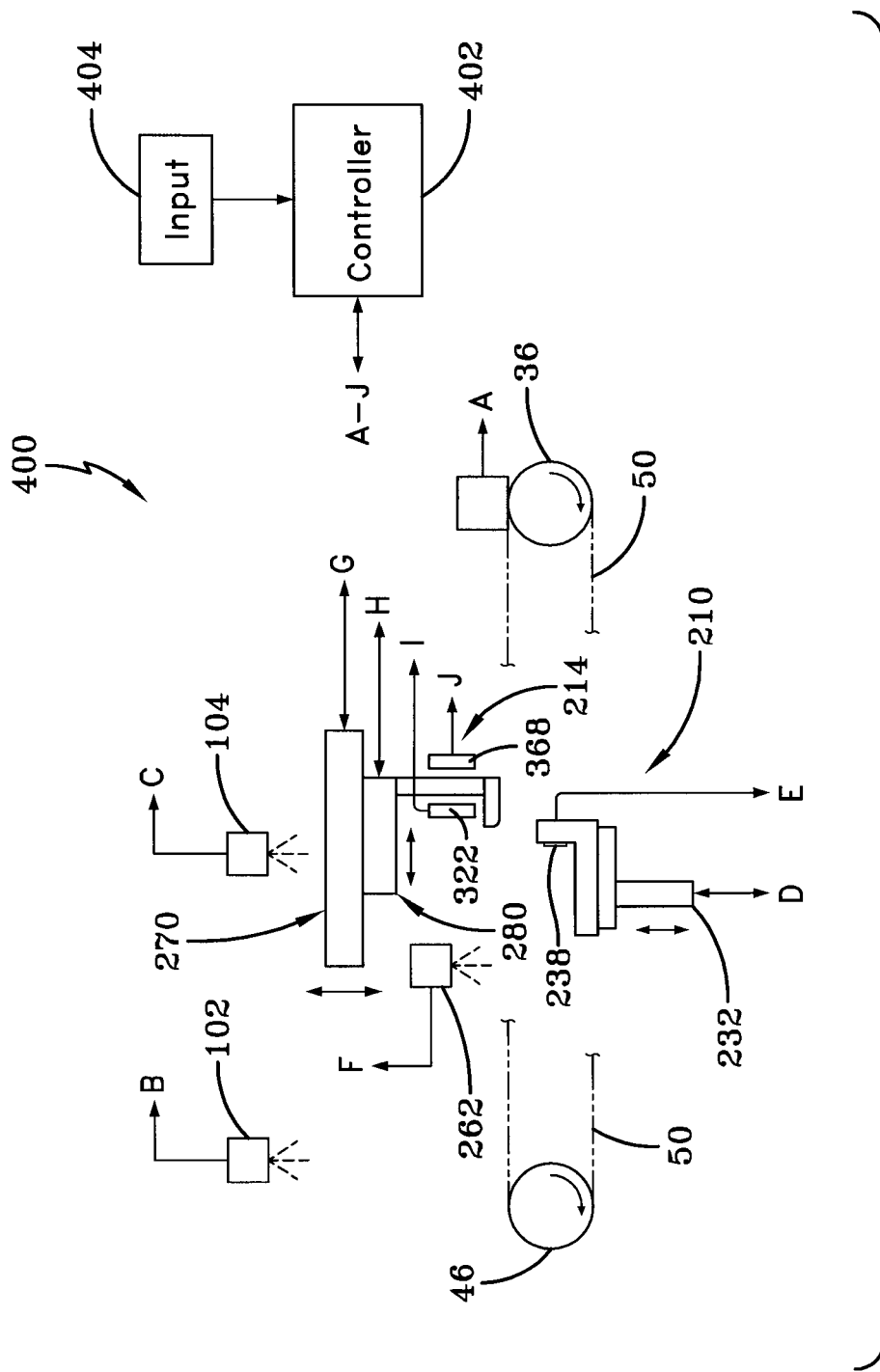
FIG. 12 is a schematic diagram of the alternative marking apparatus and associated control system according to the concepts of the present invention.

The marking assembly 214 includes a marking head frame 314 which is secured to the linear motor assembly 310, which may operate a linear positioning table. As best seen in FIG. 11, the marking head frame 314 is connected to and suspended from the table associated with the linear motor assembly 310 wherein a top marker cylinder bracket 316 is connected to the marking head frame 314 and extends substantially perpendicularly therefrom. A corresponding bottom marker cylinder bracket 320 extends in the same direction as the bracket 316 and is also perpendicular to the marking head frame 314. A plurality of double-acting stamp cylinders 322 are carried between the brackets 316 and 320 and are oriented in a substantially vertical direction, although this orientation may be adjusted depending on the particular end use. In the embodiment shown, six markers are employed and are arranged on an arc to match that of the bead of the tire to be marked. However, skilled artisans will appreciate that any number of stamping cylinders may be provided and in any configuration as required by a particular end use. Disposed at the end of each cylinder is a marking stamp 326 which is provided with a desired marking indicia. The indicia may be a number, a letter, a shape, or any combination thereof.

An ink tray assembly designated generally by the numeral 350 is carried by the marking head frame 314 and in the present embodiment is pivotable with respect to the end of the marking head frame 314 that is opposite the linear positioning table 310. The ink tray assembly 350 carries an ink tray 352 wherein any number of ink pads 354 may be carried by the tray 352 and are positioned to be in relationship with the marking stamps 326. The ink pads 354 may be provided in different colors and associated with a particular stamp and/or all of the stamps carried by the marking head frame. During most of the operation of the marking assembly, the ink tray assembly 350 is maintained in a horizontal orientation with respect to the ends of the marking stamps 326. As will be described in detail later, the ink tray 352 is pivoted away from the horizontal orientation with respect to the marking stamps so that they may mark the object as desired. In any event, the ink tray assembly 350 includes a pivot connection 358 which connects the tray assembly 350 to the marking head frame 314. Extending further from the ink tray is at least one tray lug 360 which has a lug pin 362 extending between the lugs.

A frame lug 366 is connected to the marking head frame 314 and extends in a direction opposite the top marker cylinder bracket 316. Connected between the frame lug 366 and the tray lugs 360 is a tray double-acting cylinder 368 wherein one end of the cylinder is connected to the frame lug 366 and a piston 370 extending from the cylinder is connected to the tray lug 360. Actuation of the cylinder 368 retracts the piston and the connected tray from a substantially horizontal position to a somewhat vertical position parallel with the marking head frame 314. In this retracted position, the markers are allowed to move substantially vertically from their resting position to a position that marks the object as desired.

As in the previous embodiment, a photo eye assembly 100 is configured to be carried by the conveyor table to assist in monitoring the position of the object to be marked. The photo eye assembly 100 includes an entry photo eye 102 which detects the leading edge of the object as it is received on the conveyor table. A second position photo eye 104 also detects the leading edge of the object as it proceeds along the conveyor table and when the object is detected by the photo eye the conveyor is instructed to stop. In other words, the photo eyes 102 and 104 are used to confirm the presence, or the lack thereof, of the tire or object to be marked. The brace photo eye 262 is used to confirm the position of the tire or object, and specifically to determine when to raise the pin stop assembly 210.

Generally, in operation of the alternative marking assembly, a control system similar to the one used in the previous embodiment is employed. In particular, referring now to FIG. 12, it can be seen that a control system is designated generally by the numeral 400. The control system 400 includes a controller 402 which receives inputs from the various photo eyes and other sensors and generates various outputs so as to control the conveyor table, the height adjustment apparatus, the lateral adjustment apparatus, the tray double-acting cylinder 368 and the double-acting stamp cylinders 322. The controller 402 operates in much the same manner as the controller 112 regarding inputs and outputs and any other feature as described in relation thereto. It will also be appreciated that the controller receives marking input 404 which is received in most embodiments from a testing apparatus which indicates the quality of the tire just tested and being received within the marking apparatus 200. In other words, if a tire meets all of the test requirements then a stamp may be applied to the tire bead area indicating its acceptability for use in an original equipment manufacturer's tire. However, if the test results indicate that the tire is only suitable for sale at replacement tire facilities, then another mark may be employed. If the tire does not comply with testing requirements, then it may be marked appropriately for either re-working of the tire or other repairs as may be deemed appropriate.

Generally, the operation sequence is as follows. The object to be marked enters the conveyor belt at the entry side wherein the conveyor motor 32 generates and receives signal A from the controller 402. The object is detected by the entry photo eye 102 which generates input signal B received by the controller 402. Based upon known or expected size parameters of the object to be marked, the controller and the conveyor motor move the conveyor belt and the object to be marked a known distance until the proper distance is obtained or the object is detected by the secondary position photo eye 104 which generates an input signal C received by the controller 402. At this time it is presumed the object to be marked is in an appropriate position and the stop pin assembly 210 is raised from its recessed or retracted position via a control signal D generated by the controller 402 to a position above the conveyor belts and within an opening provided by the object to be marked. Once this operation is completed, the conveyor belt may be instructed by the controller 402 to move forward until the object comes in contact with the stop pins 236. In some embodiments the switch or sensor 238 may be associated with the pin stop assembly and send such detection information to the controller via signal E. This may also be confirmed by input received from the brace photo eye 262 which sends a control signal F to the controller.

Next, the height adjustment apparatus 270 may be raised or lowered to a position via control signal G so as to place the marking assembly 214 in an approximate position to allow for marking of the object. Skilled artisans will appreciate that the height adjustment apparatus 270 may be operated in advance of receiving the object to be marked based upon a known size width of the object to be received. Use of the height adjustment apparatus allows for shorter marking cylinders to be used in the marking operation. In any event, upon completion of the height adjustment apparatus operation, the controller instructs the lateral adjustment apparatus 280 via the control signal H to move the marking head frame via the linear motor assembly 310 to an appropriate position such that the marking stamps are aligned with a surface of the object to be marked. Skilled artisans will appreciate that the lateral adjustment apparatus 280 may be operated in advance of receiving the object to be marked based upon a known size of the object to be received. At this time, based upon the input information received from the testing apparatus, the cylinders associated with the markers are actuated so as to engage or contact the ink pads 354. Next, the cylinder 368 is actuated via control signal J via control signal I so as to withdraw the ink tray from its substantially horizontal position to a retracted position. Once the tray 352 is moved away, then the controller instructs the appropriate stamp cylinders 322 to actuate, again via control signal I, so as to mark, with an appropriate dwell time, the surface of the tire with the appropriate marking. Once the stamp cylinders are retracted and the marking procedure is completed, the tray cylinder 368 is actuated via control signal J so as to move the tray back to its substantially horizontal position and the lateral adjustment apparatus moves the marking frame to an appropriate retracted position, if required. Next, the pin assembly is retracted so as to be again recessed underneath the conveyor belts and then the conveyor motor is re-energized so as to move the object marked along toward the exit side of the conveyor.

The present embodiment is advantageous in that it allows for marking of the object from an upper position instead from a lower position underneath the conveyor table. This process employs ink which is less likely to dry out on markers and which also removes the need to maintain pump pressures and proper filling of the paint trays as provided in the previous embodiment. The ink also typically provides for faster drying so that it is not later smudged or smeared during the transfer of the object marked to another manufacturing station.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An apparatus to mark a surface of an object, comprising:
   a conveyor assembly having spaced apart, conveyor belts with a conveyor opening therebetween, said conveyor assembly having an entry side and an exit side that supports the object;
   a marking assembly aligned with said conveyor opening, and a marker head of said marking assembly being movable between a retracted position away from said conveyor belts, which allows movement of the object from said entry side to said exit side, and an operate position proximal the surface to be marked, wherein said operate position is within said conveyor opening, wherein, in said retracted position, said marker head of said marking assembly is beneath said conveyor belts, and wherein, in said operate position, said marker head of said marking assembly is above said conveyor belts; and
   at least one marker carried by said marker head of said marking assembly, said at least one marker configured to mark the surface of the object when said marker head of said marking assembly is in said operate position.

2. The apparatus according to claim 1, wherein said operate position orients said marker head of said marker assembly toward the surface of the object to be marked that is not otherwise accessible from an external radial position of the object.

3. The apparatus according to claim 2, further comprising:
   a photo eye assembly to detect when the object is in a position to allow said marker head of said marking assembly to move into said operate position.

4. The apparatus according to claim 2, wherein said marking assembly further comprises:
   a linear motor assembly that carries and moves said at least one marker between said retracted position and said operate position.

5. The apparatus according to claim 4, wherein said marking assembly further comprises:
   said marker head being carried by said linear motor assembly;
   at least one vertically extending pin that contacts the object to be marked, wherein said at least one marker is positionally offset from said at least one vertically extending pin.

6. The apparatus according to claim 5, wherein said conveyor assembly moves the object into contact with said at least one vertically extending pin prior to said at least one marker marking the surface of the object.

7. The apparatus according to claim 2, further comprising:
   a controller;
   said conveyor assembly and said marking assembly being connected to said controller to sequence operation of said conveyor assembly and said marking assembly, including to transfer the object from said entry side to said exit side, to move said marker head of said marking assembly between said retracted position and said operate position, and to move said at least one marker to mark the object.

8. The apparatus according to claim 7, wherein said at least one marker includes a plurality of markers, wherein said controller receives test input whereupon said controller selects which of said plurality of markers will mark the surface based on the test input.

9. The apparatus according to claim 8, further comprising:
   a photo eye assembly connected to said controller, said photo eye assembly detecting the presence of the object on said spaced apart conveyor belts, wherein said controller controls the conveyor system so as to align the object with said operate position.

10. The apparatus according to claim 9, further comprising:
    at least one pin carried by said marking assembly;
    a pin sensor associated with said at least one pin and connected to said controller, wherein said pin, when in said operate position, is contacted by the object so that said pin senor sends a sensor signal to said controller which then stops said conveyor belts through said conveyor system.

11. An apparatus to mark a surface of an object, comprising:
    a conveyor assembly having spaced apart conveyor belts with a conveyor opening therebetween, said conveyor assembly having an entry side and an exit side that supports the object;
    a marking assembly movable between a retracted position away from said conveyor belts, which allows movement of the object from said entry side to said exit side, and an operate position proximal the surface to be marked; and
    at least one marker carried by said marking assembly, said at least one marker configured to mark the surface of the object when said marking assembly is in said operate position;
    wherein said operate position orients said marking assembly toward the surface of the object to be marked that is not otherwise accessible from an external radial position of the object;
    the apparatus further comprising:
    a carriage assembly that straddles said conveyor;
    a height adjustment apparatus carried by said carriage assembly; and
    a lateral adjustment apparatus carried by said carriage assembly, wherein one of said height adjustment apparatus and said lateral adjustment apparatus carry said marking assembly;
    wherein said marking assembly comprises:
    a marking head frame;
    a plurality of double-acting stamp cylinders coupled to said marking head frame, each said cylinder having an axially extending marking stamp; and
    at least one ink pad engageable by each said axially extending marking stamp prior to marking the surface.

12. The apparatus according to claim 11, wherein said marking assembly further comprises:

an ink tray assembly that carries said at least one ink pad and that is pivotably connected to said marking head frame and which is normally maintained in a position engageable by said plurality of double-acting stamp cylinders, wherein said marking stamps first engage said at least one ink pad prior to said ink tray pivoting away from said marking head frame and marking the surface.

13. The apparatus according to claim 12, further comprising:
a controller;
said conveyor assembly, said height adjustment apparatus, said lateral adjustment apparatus, and said plurality of double-acting stamp cylinders connected to said controller which sequences their operation to transfer the object from said entry side to said exit side, and moves said height adjustment apparatus and said lateral adjustment apparatus so as to move said marking assembly and actuate said double-acting stamp cylinders to mark the surface.

14. The apparatus according to claim 13, wherein said controller receives test input and selects which of at least said plurality of double acting cylinders should be actuated to mark the surface.

15. A method for marking an object, comprising:
receiving an object on spaced apart conveyor belts which form an opening therebetween;
detecting a position of the object;
positioning a marking assembly beneath said conveyor belts and aligned with said opening;
moving a marker head of said marking assembly from a retracted position to an operate position within said opening so that said marker head of the marking assembly is oriented to the surface of the object to be marked that is not otherwise accessible from an external radial position of the object, wherein said step of moving said marker head of said marking assembly includes raising said marker head of said marking assembly above said conveyor belts;
marking a surface of the object with said marker head of said marking assembly, wherein said step of marking said surface occurs while said marker head of said marking assembly is above said conveyor belts; and
returning said marker head of said marking assembly to said retracted position and moving the conveyor belts to move the object.

16. The method according to claim 15, further comprising:
confirming a position of the object prior to marking the surface of the object.

17. The method according to claim 16, further comprising:
coupling a pin switch to said at least one pin, wherein activation of said pin switch confirms alignment of the object's surface prior to printing.

18. The method according to claim 16, further comprising:
moving the object on said conveyor bells after said marker head of said marking assembly is moved into said operate position; and
stopping the object after confirming alignment of the object's surface.

19. The method according to claim 18, further comprising:
configuring said marking assembly with at least one pin and at least one marker offset from said at least one pin, said at least one pin confirming alignment of the object's surface; and
linearly moving said at least one marker carried by said marking assembly to mark the object's surface.

20. A method for marking an object, comprising:
receiving an object on spaced apart conveyor belts which form an opening therebetween;
detecting a position of the object;
providing a marking assembly comprising a marking head frame, a plurality of double-acting stamp cylinders coupled to said marking head frame, each said cylinder having an axially extending marking stamp, and at least one ink pad engageable by each said axially extending marking stamp prior to marking the surface;
positioning said marking assembly above said conveyor belts in a carriage assembly;
providing a height adjustment apparatus and a lateral adjustment apparatus carried by said carriage assembly;
moving said marking assembly from a retracted position to an operate position so that the marking assembly is oriented to the surface of the object to be marked that is not otherwise accessible from an external radial position of the object, wherein one of said height adjustment apparatus and said lateral adjustment apparatus carry said marking assembly to thereby move said marking assembly to said operate position;
marking a surface of the object with said marking assembly; and
returning said marking assembly to said retracted position and moving the conveyor belts to move the object.

* * * * *

UNITED STATES PATENT AND TRADEMARK OFFICE
CERTIFICATE OF CORRECTION

PATENT NO. : 11,247,514 B2
APPLICATION NO. : 16/330814
DATED : February 15, 2022
INVENTOR(S) : Brian Mitchell et al.

It is certified that error appears in the above-identified patent and that said Letters Patent is hereby corrected as shown below:

In the Claims

In Claim 18, Line 2 the term "conveyor bells" should be "conveyor belts".

Signed and Sealed this
Twenty-sixth Day of April, 2022

Katherine Kelly Vidal
*Director of the United States Patent and Trademark Office*